US007763201B2

(12) United States Patent
Schiller

(10) Patent No.: US 7,763,201 B2
(45) **Date of Patent: *Jul. 27, 2010**

(54) DEVICE AND METHOD FOR THE PRODUCTION OF A MULTI-LAYER CONCRETE PIPE

(75) Inventor: Gunther Schiller, Diez (DE)

(73) Assignee: Schlosser-Pfeiffer GmbH, Aarbergen (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/813,605

(22) Filed: Mar. 30, 2004

(65) Prior Publication Data

US 2004/0227274 A1 Nov. 18, 2004

(30) Foreign Application Priority Data

Mar. 31, 2003 (DE) ............................... 103 14 722

(51) Int. Cl.
*B28B 1/30* (2006.01)
*F16L 58/06* (2006.01)

(52) U.S. Cl. .................... 264/333; 264/270; 264/36.16; 264/36.2; 425/460

(58) Field of Classification Search ................... 264/34, 264/36.16, 36.2, 262, 333, 269, 270; 425/262, 425/427, 460
See application file for complete search history.

(56) References Cited

U.S. PATENT DOCUMENTS 1,768,451 A * 6/1930 Hume ........................ 264/311
1,838,546 A 12/1931 Halstead
2,305,017 A * 12/1942 Lewis ......................... 138/141
3,262,175 A * 7/1966 Gourlie et al. .............. 425/117
4,041,118 A * 8/1977 Ottmann et al. ............... 264/71
4,197,074 A * 4/1980 Christian .................... 425/262
4,690,631 A * 9/1987 Haddy ........................ 425/262
4,957,424 A * 9/1990 Mitchell et al. ............. 425/145
5,051,223 A * 9/1991 Kern .......................... 264/256

FOREIGN PATENT DOCUMENTS

| | | |
|---|---|---|
| CH | 339 542 | 6/1959 |
| DE | 16 46 760 | 9/1971 |
| WO | WO 92/18308 | 10/1992 |

OTHER PUBLICATIONS

Translation of DE 1646760 (published Sep. 2, 1971) to Wilhelm Meyer.*

* cited by examiner

*Primary Examiner*—Matthew J. Daniels
(74) *Attorney, Agent, or Firm*—Collard & Roe, P.C.

(57) ABSTRACT

A device and a method for the production of multi-layer concrete pipes, particularly two-layer concrete pipes. The device has a first stand, in which a first pressing head that can be driven is mounted, a turntable, on which several mold mantles standing vertically can be pivoted into a stand in cycles, and a first charging system for filling a first concrete mixture into one of the mold mantles. A second pressing head having an outside diameter that is smaller than that of the first pressing head, and a second charging system for filling a second concrete mixture into one of the mold mantles are provided. In this manner, the second concrete mixture can be filled into the mold mantle, by the second charging system and the mixture can be distributed and compacted before the concrete pipe is removed from the mold mantle.

9 Claims, 6 Drawing Sheets

Fig. 9
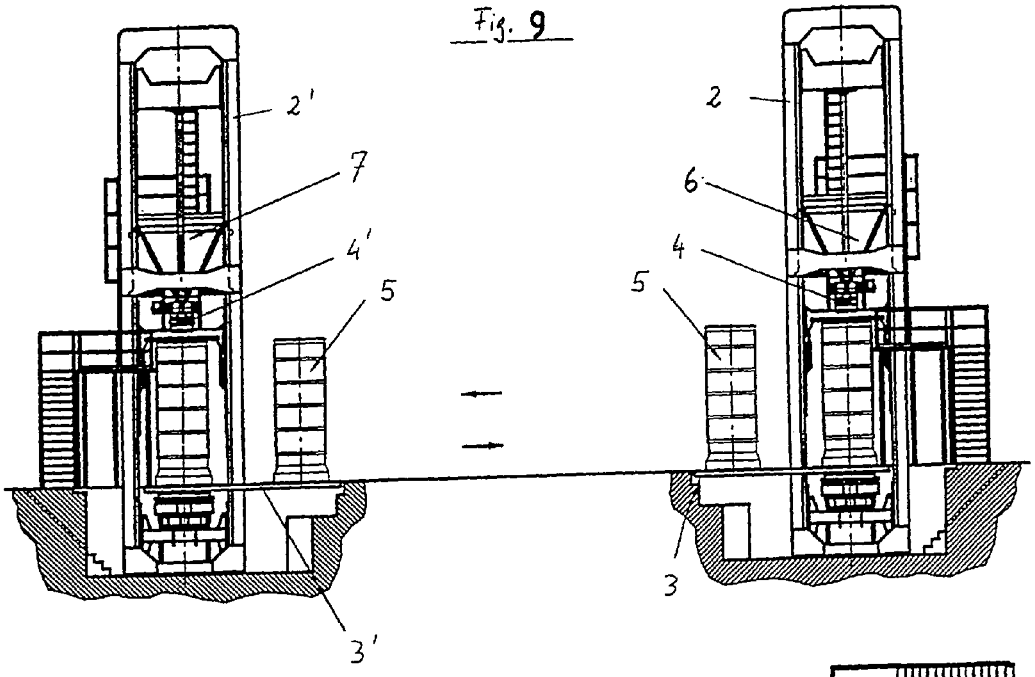
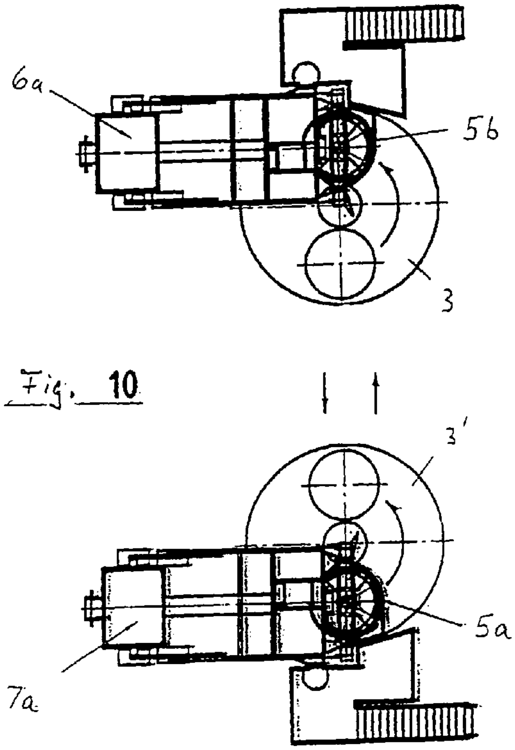
Fig. 10

11
12
13
9a
9b
ød1
ød2
5
4
10'
14
4'
13'

5
12
9a
13'
ød1
ød2
11
4
10'
13
12'
4'
9b 8b
10'
8a
2
6
4
4'
5
3

DEVICE AND METHOD FOR THE PRODUCTION OF A MULTI-LAYER CONCRETE PIPE

BACKGROUND OF THE INVENTION

1. Field of the Invention

The invention relates to a device for the production of a multi-layer concrete pipe, particularly a two-layer concrete pipe. The device has a first stand, in which a first compacting tool such as a pressing head is mounted, a turntable, on which several mold mantles stand vertically and can be pivoted into a stand in cycles, and a first charging system for filling a first concrete mixture into one of the mold mantles. Furthermore, the invention relates to a method for the production of a multi-layer pipe.

2. The Prior Art

Such concrete pipes are used, for example, for municipal and industrial sewer systems. In this connection, the wall of such a pipe fulfills various functions. For example, the wall of the pipe must absorb the static and dynamic stresses that act on it from the outside, and the inside surface is exposed to the medium to be transported. Therefore special properties, such as friction wear resistance, acid resistance, fire resistance, or the like, are often required for the inside surface. It is therefore practical to produce the wall of the pipe from several layers, whereby the layers differ from one another in their properties. In this connection, it is known to line such concrete pipes with an inner layer of an acid-resistant concrete mixture which increases the resistance of the concrete pipe. Since acid-resistant concrete mixtures are significantly more expensive than conventional concrete mixtures, only a very thin layer of the acid-resistant concrete is used to line the inside of concrete pipes.

This thin layer of acid-resistant concrete is usually applied using a spin-coating process, in which the acid-resistant concrete mixture is introduced into a pipe that is lying horizontally. In this connection, the working step of spin-coating has to be carried out until the concrete has cured, at least in part, so that the pipe can be removed from the mold in a horizontal position, without being damaged. Since the horizontal production of pipes is very time-consuming, single-layer pipes are often produced using vertical production methods, as well, using a pressing head or the like. In the case of pipes produced vertically, coatings are applied to the inside surface subsequently, or so-called liners made of plastic are installed. The installation of these coatings, some of which are very expensive, requires additional production steps. In addition, there is no intimate connection, i.e. no chemical connection between the layers, so that over the course of time, these layers can separate.

SUMMARY OF THE INVENTION

It is therefore an object of the present invention to provide a device and a method of the type stated initially, with which multi-layer concrete pipes can be produced more quickly and more economically and the connection between the individual layers is improved.

This object is accomplished, according to the invention, essentially in that a second compacting tool that can be driven, having an outside diameter that is smaller than that of the first compacting tool, and a second charging system for filling a second concrete mixture into one of the mold mantles, are provided in the device. By means of this configuration according to the invention, it is possible to provide an outer layer of a first concrete mixture with an inner second layer of a concrete mixture that is acid-resistant. The two layers are each produced by a compacting tool. In this way, the second, inner layer can be applied directly to the first, outer layer, before the outer layer has cured. In this manner, a particularly good connection between the two layers is possible. The thickness of the second, inner layer is determined by the different diameters of the compacting tools, for example the pressing heads. At the same time, particularly efficient production of multi-layer concrete pipes is possible with the device according to the invention, since the pipes produced in this manner can be removed from the mold immediately after the compacting process and before the pipes have cured.

According to a preferred embodiment of the invention, a second stand, in which the second compacting tool is mounted so that it can be driven, is assigned to the first stand, in such a manner that mold mantles can be pivoted into the second stand from the first stand, by way of the turntable, in cycles. For this purpose, the second stand is arranged in the vicinity of the first stand, so that a mold mantle can be pivoted out of the first stand and pivoted into the second stand by way of the turntable. In this connection, each stand can also have a turntable. The turntables are connected with one another by way of a suitable transport device. After the production of the outer layer of a concrete pipe in the first stand, the pipe, together with the mold mantle, is pivoted into the second stand by way of the turntable, in which the inner coating, for example of acid-resistant concrete, is produced by the second compacting tool. In this arrangement, any tool change that might be necessary between the production of the first, outer layer and the second, inner layer of the concrete pipe can be eliminated. The cycle times in the production of a multi-layer pipe can be further reduced in this manner.

In a further development of this idea, the first charging system is assigned to the first stand and the second charging system is assigned to the second stand. Consequently, in this embodiment two stands, each of them having a charging system for supplying a concrete mixture and a compacting tool, are arranged next to one another, in such a manner that they are connected by way of a common turntable or by way of two turntables connected via a transport device.

As an alternative to this, is it possible, according to another embodiment of the invention, to assign the first and second charging system to the same stand, in which the first and second compacting tool are also mounted alternately, if applicable. In this embodiment, the space requirement of such a device for the production of multi-layer concrete pipes is less than in the case of the device with two stands described above. However, with this embodiment, the production of a multi-layer concrete pipe might make a tool change necessary, since the first, outer layer of the concrete pipe is produced using a compacting tool whose diameter is greater than that of the second compacting tool with which the inner, second layer is produced.

It is preferred if at least one of the charging systems has a concrete silo with a filling belt assigned to it. As an alternative or in addition to this, the charging system can also be formed by a concrete pump having a pump hose. The use of a concrete pump can be sufficient, in particular, for supplying the second concrete mixture, for example a fire-resistant and/or acid-resistant concrete mixture, of which only a small volume proportion is needed for the production of a multi-layer concrete pipe.

In order to shorten the cycle times for the production of a multi-layer concrete pipe, the first and the second compacting tool can preferably be driven alternately in the stand, in cycles, by way of a quick-change device. The change between the first and the second compacting tool can take place automatically, for example, so that the second (inner) concrete layer can be applied particularly rapidly onto the first, outer concrete layer that has not cured yet.

A tool change as in the device having a stand as described above is not necessary if the second compacting tool is arranged below the first compacting tool, on a common shaft. In this connection, the first and the second charging systems are assigned to the same stand. In this embodiment, the supply of the material for the inner layer preferably takes place from above, through the shaft that drives the compacting tools. A two-layer pipe can thereby be produced in a single production step.

According to another embodiment of the invention, the first and the second charging systems are assigned to the same stand, in which only one compacting tool is mounted, which is radially adjustable. This radially adjustable compacting tool is therefore changeable in its outside diameter. In this way, a pipe having a first inside diameter can first be produced, using the radially adjustable compacting tool. After the outside diameter of the radially adjustable compacting tool has been changed, a further layer having a second inside diameter can be introduced into the pipe. In this embodiment, only one compacting tool is therefore necessary.

A particularly smooth inside wall and a homogeneous concrete distribution in the walls of the pipes to be produced can be achieved in that the compacting tools each have a distributor having several distributor rollers that act essentially radially, a compactor having several pressing rollers that act essentially radially, and a smoothing tool. In this connection, the concrete that is filled into the mold mantle is first uniformly distributed in the mold mantle, and pre-compacted, by means of the distributor rollers of the distributor, so that any reinforcement of the concrete mixture is surrounded. The pressing rollers of the compactor then compact the concrete mixture to such an extent that the desired inside diameter of the concrete pipe is formed. Subsequently, the surface is finished using the smoothing tool, which is preferably configured as a cylindrical piston and is arranged below the compacting tool. As an alternative to the compacting tool described, radially arranged slide rockers can also take over the distribution and compacting of the material.

The formation of torsion moments during the production of the concrete pipe using a pressing head can be avoided in that the distributor of each pressing head rotates about the longitudinal axis of the mold mantle in the opposite direction from the compactor. In this connection, the compactor and the distributor can rotate at different speeds. In this connection, the speed of the distributor is generally clearly higher than that of the compactor having the pressing rollers and the smoothing piston. In this manner, any reinforcement that might be present in the concrete pipe is also not twisted during the compacting process, so that it remains in its planned position.

According to another exemplary embodiment, a spray head for applying at least one concrete layer can be arranged in the case of at least one compacting tool, above the smoothing tool. The second concrete mixture can be distributed by means of centripetal forces that occur as a result of the rotating movement of the spray head. As a result of the impact velocity of the sprayed material onto the inside surface of the first concrete layer, the material is at least partially compacted. Consequently another distributor and/or a compactor is not necessary.

The invention also comprises a method for the production of a multi-layer concrete pipe, particularly a two-layer concrete pipe, which comprises the following steps: first, a mold mantle standing essentially vertically on a turntable is pivoted into a first stand and the mold mantle is filled with a first concrete mixture from a first charging system. This first concrete mixture is then distributed and compacted in the mold mantle by means of a rotating and vertically displaceable first compacting tool, and the inside surface is smoothed, if necessary. Before the concrete pipe is removed from the mold, a second concrete mixture is filled into the mold mantles that are standing essentially vertically, by means of a second charging system and the second concrete mixture is distributed and compacted in the mold mantle, using a second compacting tool, whose diameter is smaller than that of the first compacting tool, and the inside surface is smoothed, if necessary, before the concrete pipe is removed from the mold. In this method, the mold mantle is aligned essentially vertically during the introduction and compacting of both concrete mixtures, so that the pipes produced can be removed from the mold immediately after the compacting process and before the pipes have cured. In this way, not only is it possible to achieve shortened cycle times and therefore a more efficient production of concrete pipes, but also the connection between the individual layers of the concrete pipe is improved, since the first, outer concrete layer cannot cure before the second, inner concrete layer has been applied.

Before the second concrete mixture is filled into the mold mantle and distributed and compacted in it, the first compacting tool is preferably exchanged for the second compacting tool, by way of a quick-change device in the first stand, and that after the second concrete mixture has been filled into the mold mantle and distributed and compacted in it, and the inside surface has been smoothed, the second compacting tool is exchanged for the first compacting tool, by way of a quick-change device in the first stand. In this method, the mold mantle can remain in its essentially vertical position in the stand during the production of both layers. The mold mantle is only pivoted out of the stand, by way of the turntable, after all of the layers of the concrete pipe have been applied.

As an alternative to this, it is also possible to fill the first concrete mixture from the first charging system into the mold mantle above the first compacting tool, while at essentially the same time, the second concrete mixture is supplied from the second charging system, above the second compacting tool, through the shaft on which the compacting tools are mounted. In this connection, the compacting tools are arranged one below the other In this way, the second layer is distributed, compacted, and the inside surface is smoothed, immediately after the first layer, so that a quick-change device for the compacting tool is eliminated and the two-layer pipe can be produced in a single work cycle.

According to another embodiment of the method according to the invention, it is provided that before the second concrete mixture is filled into the mold mantle and distributed and compacted in it, the outside diameter of the first compacting tool is reversibly reduced. In this connection, the outside diameter of the compacting tool is radially adjustable. Consequently, only a single radially adjustable compacting tool is necessary for this method. In a first work cycle, the first concrete mixture is filled into the mold mantle, using the first charging system. A first, large outside diameter is set on the radially adjustable compacting tool. At this setting, a pipe having a larger inside diameter is first produced. Afterwards, the compacting tool can be brought into a starting position. Now, in another work cycle, the second concrete mixture is filled into the mold mantle, using the second charging system. A second outside diameter is set on the compacting tool, which is smaller than the first outside diameter. Using this setting, the second, inner layer having the smaller inside diameter is then applied.

As an alternative to this, it is also possible to pivot the mold mantle on the turntable out of the second stand and to pivot it, standing essentially vertically, into a second stand, before the second concrete mixture is filled into the mold mantle and distributed and compacted in it, and the inside surface is smoothed. The change-over or adjustment of the compacting tools can be eliminated in this way, thereby making the technical fittings of the device significantly simpler.

The method can be carried out in a particularly simple manner, without any additional devices, if the mold mantle is transported from the first stand, essentially standing vertically, to the second stand, and introduced there before the first concrete mixture has cured in the mold mantle. In the second stand, the second concrete mixture is then filled into the mold mantle, and it is distributed, compacted, and smoothed, using the second compacting tool. The change-over of the compacting tool can thereby be eliminated. The only thing necessary is to arrange two machines that work with known vertical pipe production methods spatially in such a manner that the transport between the machines is possible before the first layer has cured.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 9 shows a front view of a device according to another embodiment of the invention;

FIG. 10 shows a top view of the device of FIG. 9;

DETAILED DESCRIPTION OF THE PREFERRED EMBODIMENT

Figure 2:
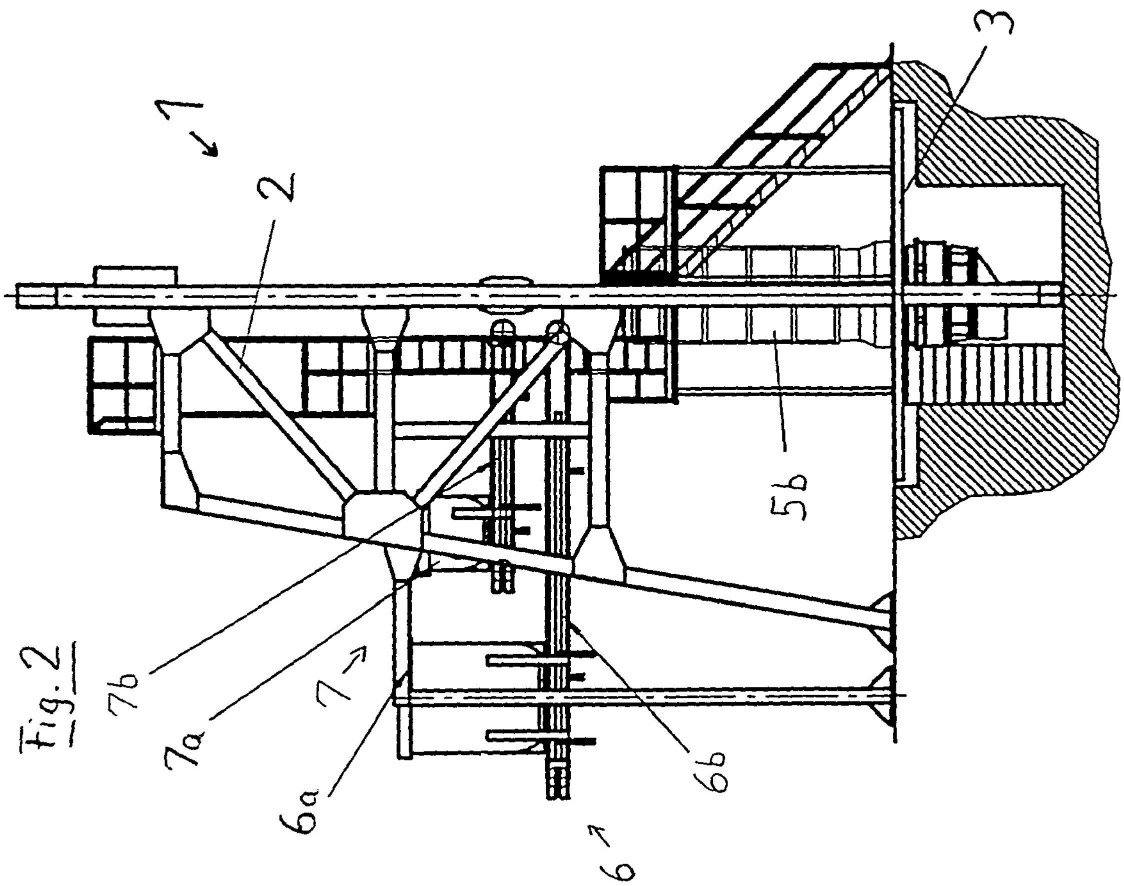
FIG. 2 shows a side view of the device according to FIG. 1.
Figure 1:
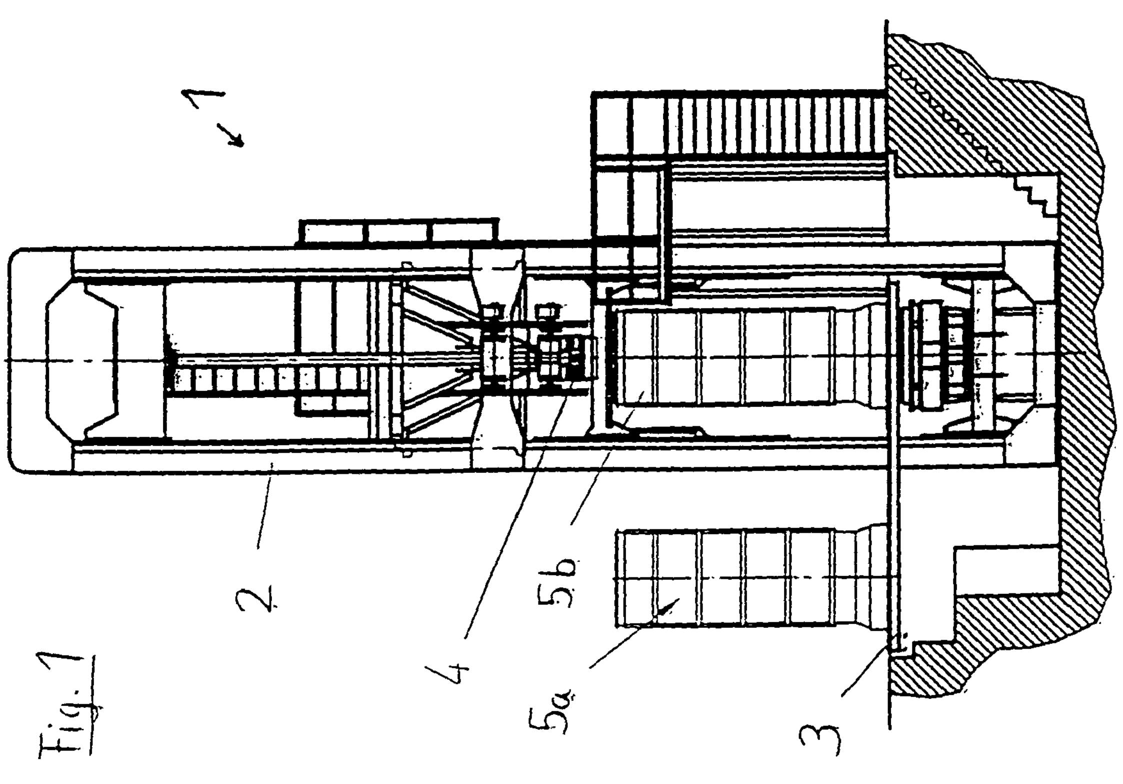
FIG. 1 shows a front view of a device according to a first embodiment of the invention.
Figure 3:
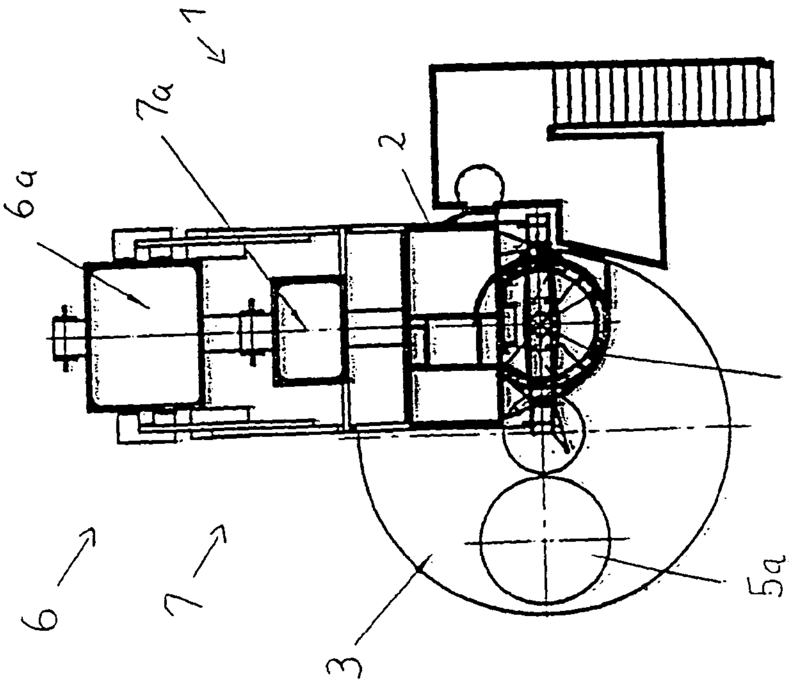
FIG. 3 shows a top view of the device according to FIG. 1.

FIGS. 1 to 3 show a first embodiment of a device 1 that has a stand 2 and a turntable 3 assigned to stand 2. A compacting tool configured as a pressing head 4, which can be displaced within stand 2 in the vertical direction and rotated about its vertical longitudinal axis, is mounted in stand 2.

Two mold mantles 5*a* and 5*b* are arranged on the turntable 3, standing essentially vertically, and mold mantle 5*b* that is, on the right in FIG. 1 has been pivoted into the stand 2. In this position, mold mantle 5*b* is located vertically below pressing head 4, so that pressing head 4 can be lowered into the mold mantle 5*b*. By means of a rotation of turntable 3, mold mantle 5*b* can be pivoted out of stand 2, and mold mantle 5*a* can be pivoted into stand 2.

As is particularly evident from the representation in FIGS. 2 and 3, a first charging system 6 having a concrete silo 6*a* and a filling belt 6*b* is arranged in stand 2. Furthermore, a second charging system 7 having a second concrete silo 7*a* and a second filling belt 7*b* is positioned in stand 2. In this connection, filling belts 6*b* and 7*b* run from concrete silo 6*a* or 7*a*, respectively, to a position above mold mantle 5*b* that is pivoted into stand 2, so that in each instance, a concrete mixture can be filled into mold mantle 5*b* via charging systems 6 and 7.

Figure 5:
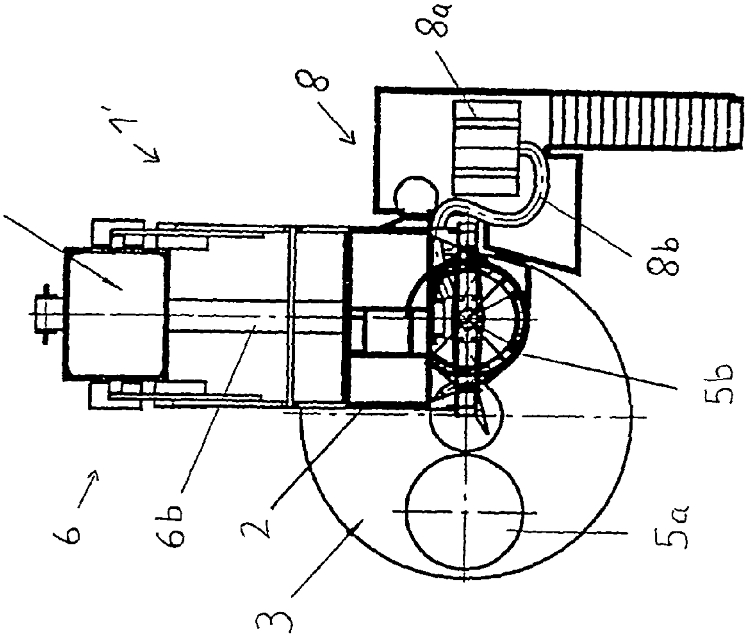
FIG. 5 shows a top view of the device of FIG. 4.
Figure 4:
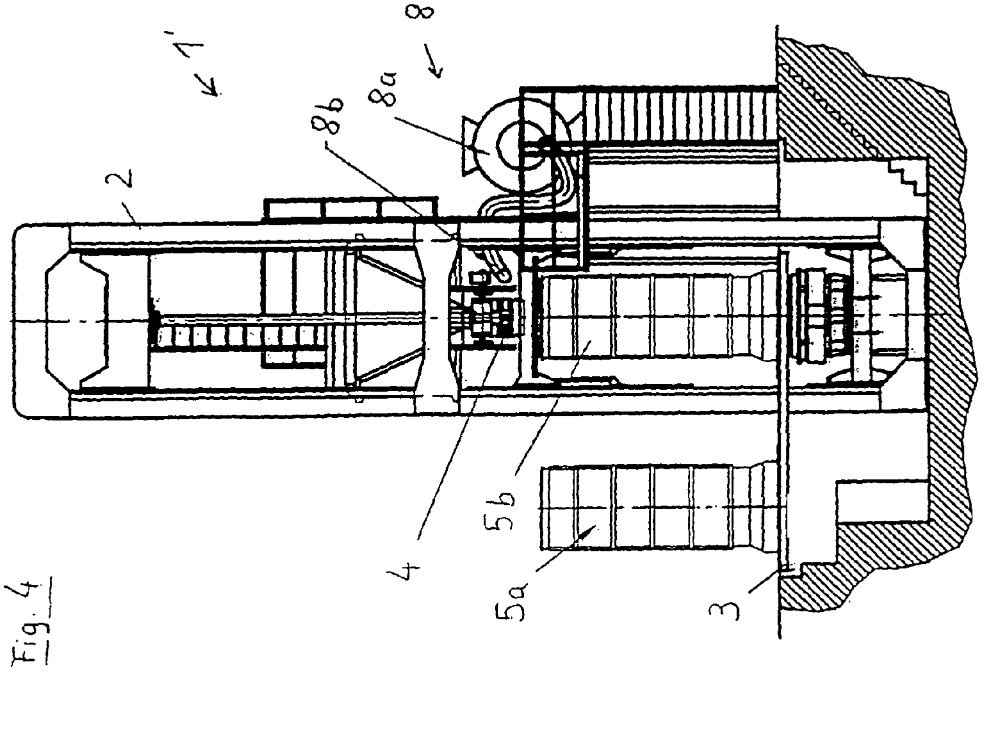
FIG. 4 shows a front view of a device according to a second embodiment of the invention.

The embodiment of the device 1' shown in FIGS. 4 and 5 essentially corresponds to the embodiments of FIGS. 1 to 3, whereby the same components are provided with the same reference numbers. Stand 2 of device 1' has a turntable 3 assigned to it, on which a mold mantle 5*b* that is pivoted into stand 2 and a second mold mantle 5*a* are positioned. Above mold mantle 5*b*, a pressing head 4 is arranged in stand 2. In addition, a first charging system 6 for filling a first concrete mixture into mold mantle 5*b* is arranged in stand 2, and has a concrete silo 6*a* and a filling belt 6*b*.

Furthermore, a second charging system 8 for filling a second concrete mixture into mold mantle 5*b* is provided in device 1'. In this connection, second charging system 8 has a concrete pump 8*a*, which is connected with a pump hose 8*b*, which in turn ends at the top of mold mantle 5*b*, so that the second concrete mixture can be filled into mold mantle 5*b* from pump hose 8*b*.

Figure 7:
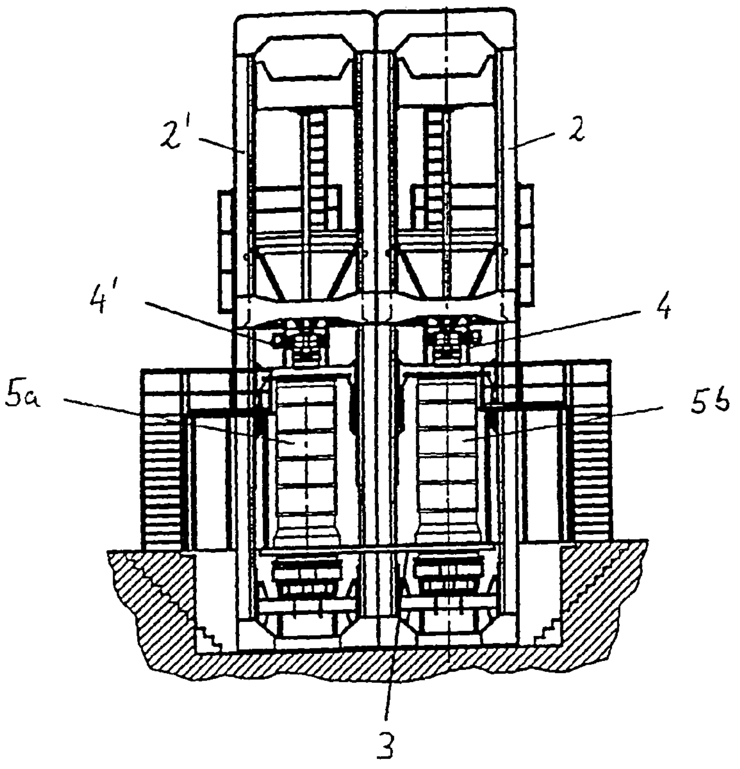
FIG. 7 shows a front view of a device according to another embodiment of the invention.
Figure 8:
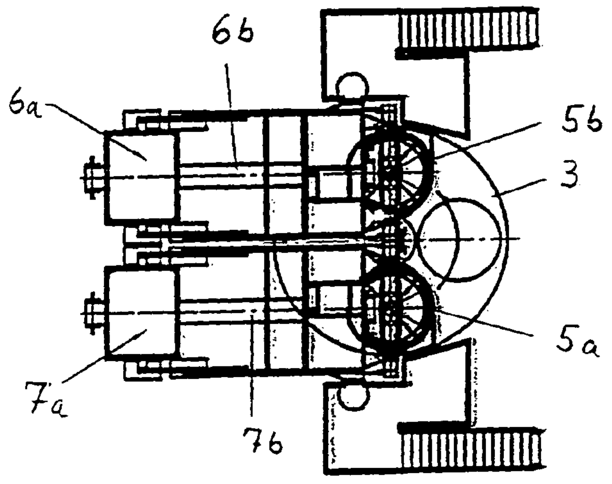
FIG. 8 shows a top view of the device of FIG. 7.

In the embodiment shown in FIGS. 7 and 8, a second stand 2' is arranged next to first stand 2, in such a manner that mold mantles 5*a*, 5*b* can be pivoted out of first stand 2 directly into second stand 2', by way of the turntable 3, and vice versa. In this connection, each of stands 2, 2' is equipped with a charging system 6 or 7, respectively, and a pressing head 4 or 4', respectively. Pressing heads 4, 4' have different diameters, in order to form layers 9*a*, 9*b* of the pipe 9. The construction space of the device shown is therefore very slight, and multi-layer pipes 9 can be produced at a high cycle number.

If the arrangement of stands 2 and 2' directly next to one another, as described with reference to FIGS. 7 and 8, is not possible for space reasons, stands 2 and 2' can also be positioned at a distance from one another, as shown in FIGS. 9 and 10. In this connection, each stand 2, 2' is equipped with a separate turntable 3, 3', a charging system 6 or 7, respectively, and a pressing head 4 or 4', respectively. A transport device indicated by the double arrows is provided between stands 2, 2', by means of which mold mantles 5*a*, 5*b* can be transported from first stand 2 into second stand 2' and vice versa. In this manner, it is also possible to retrofit a device for the production of a single-layer pipe, having a single stand 2, by providing an additional stand 2' having a second charging system 7, in such a manner that multi-layer pipes 9 can be produced.

Figure 6:
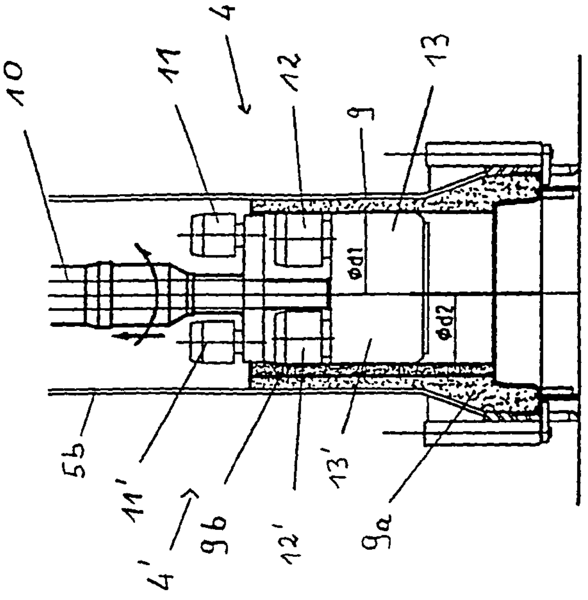
FIG. 6 shows a cross-sectional view of a pipe during production.

FIG. 6 shows two production steps in the production of a two-layer concrete pipe 9, whereby the right half shows the compacting of the first, outer layer 9*a*, using first pressing head 4, while the left half of FIG. 6 shows application of the second, inner layer 9*b*, using compacting tool configured as a pressing head 4'.

Pressing heads 4, 4' are mounted on a shaft 10 and can be moved in the vertical direction by means of the shaft 10. Each of the two pressing heads 4, 4' has several distributor rollers 11, 11', several compacting rollers or pressing rollers 12, 12', and smoothing pistons 13, 13'. In this connection, distributor rollers 11, 11' run about shaft 10 at a high speed, and thereby distribute the concrete that is filled into mold mantle 5*b* at the top on the wall of mold mantle 5*b*, in the radial direction. Pressing rollers 12, 12', which together describe a larger diameter than distributor rollers 11, 11', run at a lower speed, together with smoothing pistons 13, 13', and in the opposite direction to the distributor rollers 11, 11', about shaft 10. As shown in FIG. 6, the concrete is compacted and smoothed on the walls of mold mantle 5*b*, in this process.

In the following, the method for the production of multi-layer concrete pipes 9 will now be explained. First, an empty mold mantle 5*b* is pivoted into the position within the stand 2 shown in the figures, by way of turntable 3. A first concrete mixture is filled into mold mantle 5*b* by means of first charging system 6, from concrete silo 6*a*, by way of the filling belt 6*b*. At the same time, first pressing head 4 in stand 2 is lowered down into mold mantle 5*b*, so that the first concrete mixture is distributed and compacted in mold mantle 5*b* by first pressing head 4. By filling in additional concrete and, at the same time, rotating and lifting pressing head 4 within mold mantle 5*b*, a single-layer concrete pipe 9*a* is formed in this manner, from the bottom to the top.

When concrete pipe 9*a* in mold mantle 5*b* is finished, the supply of the first concrete mixture from concrete silo 6*a* is stopped, and pressing head 4 is moved completely out of mold mantle 5*b*. First pressing head 4 is then replaced with a second pressing head 4', for example by way of a quick-change device, the diameter $d_2$ of which is smaller than the diameter $d_1$ of the first pressing head 4. This second pressing head 4' is then lowered into mold mantle 5*b*, while at the same time, a second concrete mixture is filled into mold mantle 5*b* from the second concrete silo 7*a*, by way of filling belt 7*b* or concrete pump 8*a* and pump hose 8*b*, which mixture is distributed and compacted by pressing head 4'. In this connection, the second concrete mixture combines with the first concrete mixture in the mold mantle 5*b*, which has not cured yet, so that a two-layer concrete pipe 9*a*, 9*b* is formed.

When second pressing head 4' has also been completely moved out of mold mantle 5*b*, towards the top, the finished concrete pipe 9 in mold mantle 5*b* on turntable 3 can be pivoted out of the stand 2, whereby at the same time, an empty mold mantle 5*a* is pivoted into stand 2. Now, two-layer concrete pipe 9 can be transported to the curing location and can be removed from the mold mantle before curing, if necessary.

As an alternative to this method, it is also possible to pivot mold mantle 5*b*, by means of turntable 3, out of stand 2 after the production of the first, outer layer 9*a* of concrete pipe 9 by means of pressing head 4 in stand 2, and to pivot it into a stand 2' as shown in FIGS. 7 and 8, or, as indicated in FIGS. 9 and 10, to transport it to a second stand 2', in which the second, inner layer 9*b* is produced, using a second pressing head 4' and a second charging system. In the same manner, concrete pipes with additional inner layers can also be produced. In this connection, the concrete pipes can have a reinforcement, for example a cage made of steel wire.

Figure 11:
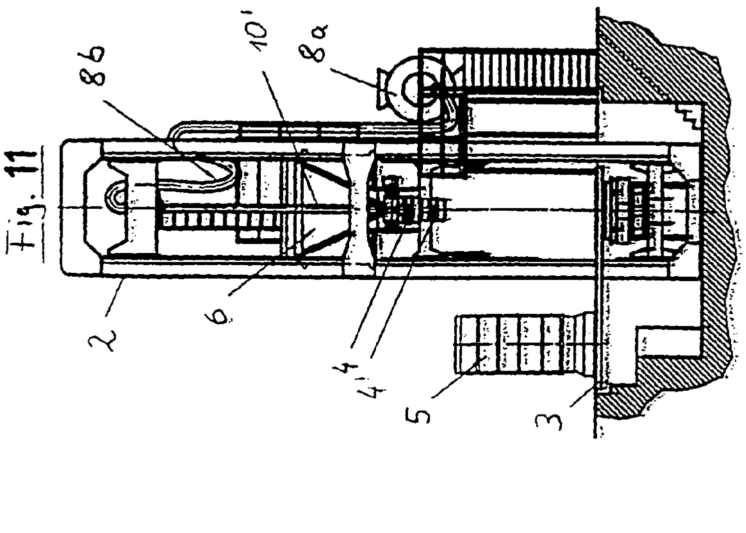
FIG. 11 shows a front view of a device according to another embodiment of the invention.

Another embodiment of the device for the production of a two-layer concrete pipe 9 is shown in FIG. 11. For this purpose, two charging systems 6 and 8 are provided in stand. 2, next to turntable 3 for pivoting a mold mantle 5 in and out, whereby charging system 8 for the second concrete mixture has a concrete pump 8*a* that is connected with a pump hose 8*b*, which opens into a hollow shaft 10'. A first compacting tool 4 and, vertically below it, a second compacting tool 4' are mounted on the hollow shaft 10'.

As shown in FIG. 11, the first compacting tool, which is configured as a pressing head 4, has several distributor rollers 11, several compacting rollers or pressing rollers 12, and a smoothing piston 13. In this connection, the distributor rollers 11 run about the shaft 10' at a high speed, and thereby distribute the concrete that is filled into the mold mantle 5 from the top on the wall of the mold mantle 5, in the radial direction. Pressing rollers 12, which together describe a larger diameter than distributor rollers 11, run at a lower speed, together with the smoothing piston 13, and in the opposite direction to distributor rollers 11, about shaft 10', so that the first concrete mixture is compacted and smoothed on the walls of mold mantle 5, in this process, as outer layer 9*a*.

In the same manner, the second compacting tool, which is also configured as a pressing head 4', also has several compacting rollers or pressing rollers 12' and a smoothing piston 13'. An exit opening is provided in hollow shaft 10', between first pressing head 4 and second pressing head 4', through which the second concrete mixture is introduced into mold mantle 5 from pump 8*a*. Pressing rollers 12', which together describe a smaller diameter $d_2$ than the first smoothing piston 13, run about shaft 10' together with second smoothing piston 13', so that the second concrete mixture is compacted and smoothed on the wall of the mold mantle 5, in this process, as inner layer 9*b*. In this manner, two-layer pipe 9 is produced in one work step. The transport of the mold mantles between two stands 2, 2' as described above, as well as a tool change between the processing steps, can therefore be eliminated.

Figure 13:
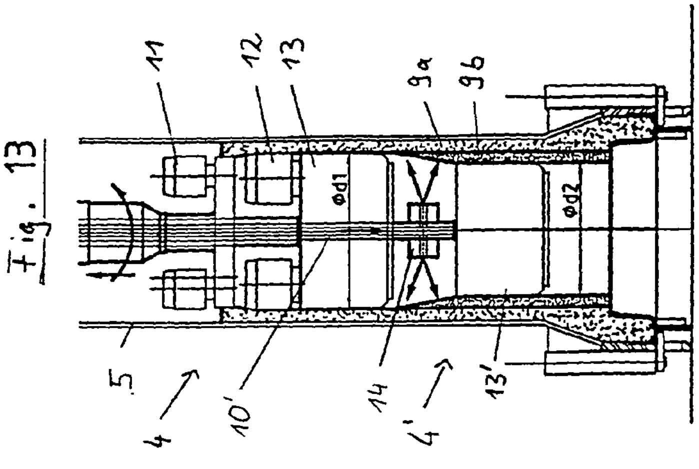
FIG. 13 shows a cross-sectional view of a pipe during production in a device according to another embodiment.
Figure 12:
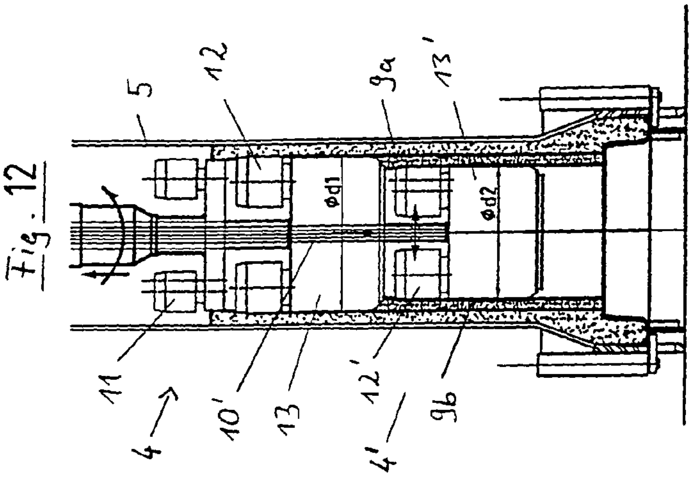
FIG. 12 shows a cross-sectional view of a pipe during production in the device according to FIG. 11.

As an alternative to this, the second concrete mixture can be applied as an inner layer 9*b*, for example, by way of a spray head 14 shown in FIG. 13, which is provided on hollow shaft 10' below the smoothing piston 13 of the first pressing head 4. By means of the pressure generated by the pump 8*a*, as well as centripetal forces, the second concrete mixture is firmly connected with the outer layer 9*a* when it impacts the latter. It is therefore not necessary to provide distributor rollers 11' or pressing rollers 12' in second pressing head 4'. Inner layer 9*b* is smoothed by smoothing piston 13' of second pressing head 4'.

REFERENCE SYMBOL LIST

1, 1' device
2, 2' stand
3, 3' turntable
4 first pressing head (compacting tool)
4' second pressing head (compacting tool)
5, 5*a*, 5*b* mold mantle
6 first charging system
6*a* concrete silo
6*b* filling belt
7 second charging system
7*a* concrete silo
7*b* filling belt
8 second charging system
8*a* concrete pump
8*b* pump hose
9 concrete pipe
9*a* first, outer layer
9*b* second, inner layer
10 shaft
10' hollow shaft
11, 11' distributor roller
12, 12' pressing roller (compacting roller)
13, 13' smoothing-piston (smoothing tool)
14 spray head
$d_1$ inside diameter of the outer layer 9*a*
$d_2$ inside diameter of the inner layer 9*b*

What is claimed is:

1. A method for the production of a multi-layer concrete pipe, comprising the following steps:

producing an outer layer by filling a mold mantle which stands essentially vertically, with a first concrete mixture by means of a first charging system and compacting said first concrete mixture in the mold mantle;

producing at least one inner layer by filling said outer layer within said mold mantle, which stands essentially vertically, with a second concrete mixture, which is an acid-resistant concrete mixture different from said first concrete mixture, by means of a second charging system;

compacting the inner concrete layer with compacting rollers that act essentially radially and with a smoothing tool; and removing the concrete pipe formed from the first and second concrete mixtures from the mold;

wherein said at least one inner layer is applied directly to said outer layer before said outer layer is cured.

2. The method according to claim 1, wherein said mold mantle stands on a turntable and is pivoted into a first stand prior to producing said outer layer.

3. The method according to claim 2, wherein before the second concrete mixture is filled into the mold mantle and distributed and compacted in said mold mantle, the mold mantle on the turntable is pivoted out of the first stand and pivoted, standing essentially vertically, into a second stand.

4. The method according to claim 2, wherein before the second concrete mixture is filled into the mold mantle and distributed and compacted in it, the mold mantle on the turntable is transported from the first stand, essentially standing vertically, to a second stand, and is introduced on another turntable, into the second stand.

5. The method according to claim 1, wherein said outer layer is compacted with a first compacting tool, and the inner layer is compacted with a second compacting tool that has a smaller diameter than a diameter of the first compacting tool, and wherein the first and second compacting tools distribute the concrete mixtures in said mold mantle and said outer layer, respectively.

6. The method according to claim 5, wherein before the second concrete mixture is filled into the mold mantle and distributed and compacted in said mold mantle, the first compacting tool is exchanged for the second compacting tool, by way of a quick-change device in the first stand, and wherein after the second concrete mixture has been filled into the mold mantle and distributed and compacted, the second compacting tool is exchanged for the first compacting tool, by way of a quick-change device in the first stand.

7. The method according to claim 5, wherein the first concrete mixture from the first charging system is filled into the mold mantle above the first compacting tool, while at essentially the same time, the second concrete mixture is supplied from the second charging system, above the second compacting tool, through a shaft on which the compacting tools are mounted.

8. The method according to claim 1, wherein said concrete pipe formed from the first and second concrete mixtures is removed from said mold immediately after the compacting process and before the pipe is cured.

9. The method according to claim 1, wherein the inner and outer layers are compacted with a single compacting tool having a radially adjustable compacting tool, and wherein before the second concrete mixture is filled into the mold mantle and distributed and compacted in said mold mantle, an outside diameter of the compacting tool is reversibly reduced.

* * * * *